United States Patent [19]
Iwasaki et al.

[11] Patent Number: 6,073,668
[45] Date of Patent: Jun. 13, 2000

[54] VEHICLE TIRE INCLUDING TREAD PORTION HAVING PROFILE

[75] Inventors: Naoaki Iwasaki, Tokyo; Chieko Aoki, Kobe, both of Japan

[73] Assignee: Sumitomo Rubber Industries, Inc., Hyogo-ken, Japan

[21] Appl. No.: 09/058,841

[22] Filed: Apr. 13, 1998

[30] Foreign Application Priority Data

Apr. 16, 1997 [JP] Japan ..................................... 9-099301
Jun. 12, 1997 [JP] Japan ..................................... 9-155184

[51] Int. Cl.$^7$ ............................... B60C 3/00; B60C 11/00
[52] U.S. Cl. ....................................... 152/209.14; 152/454
[58] Field of Search ............................. 152/209.14, 454, 152/209.11

[56] References Cited

U.S. PATENT DOCUMENTS 2,052,130  8/1936  Cassady .
4,155,392  5/1979  Duderstadt et al. ................ 152/209.14
4,434,830  3/1984  Landers et al. .......................... 152/454
5,450,885  9/1995  Hanya ................................. 152/209.26
5,630,892  5/1997  Williams et al. ......................... 152/454

*Primary Examiner*—Steven D. Maki
*Attorney, Agent, or Firm*—Birch, Stewart, Kolasch & Birch, LLP

[57] ABSTRACT

A vehicle tire which has an aspect ratio of less than about 55% and comprises a tread portion having a profile whose radius of curvature decreases substantially continuously from the tire equator to each tread edges. The tread profile from the tire equator to each tread edge is substantially defined by a curve such as ellipse, cycloid, epicycloid, involute curves and the like, of which equation is differentiable in the range between the tire equator and each tread edge.

3 Claims, 13 Drawing Sheets

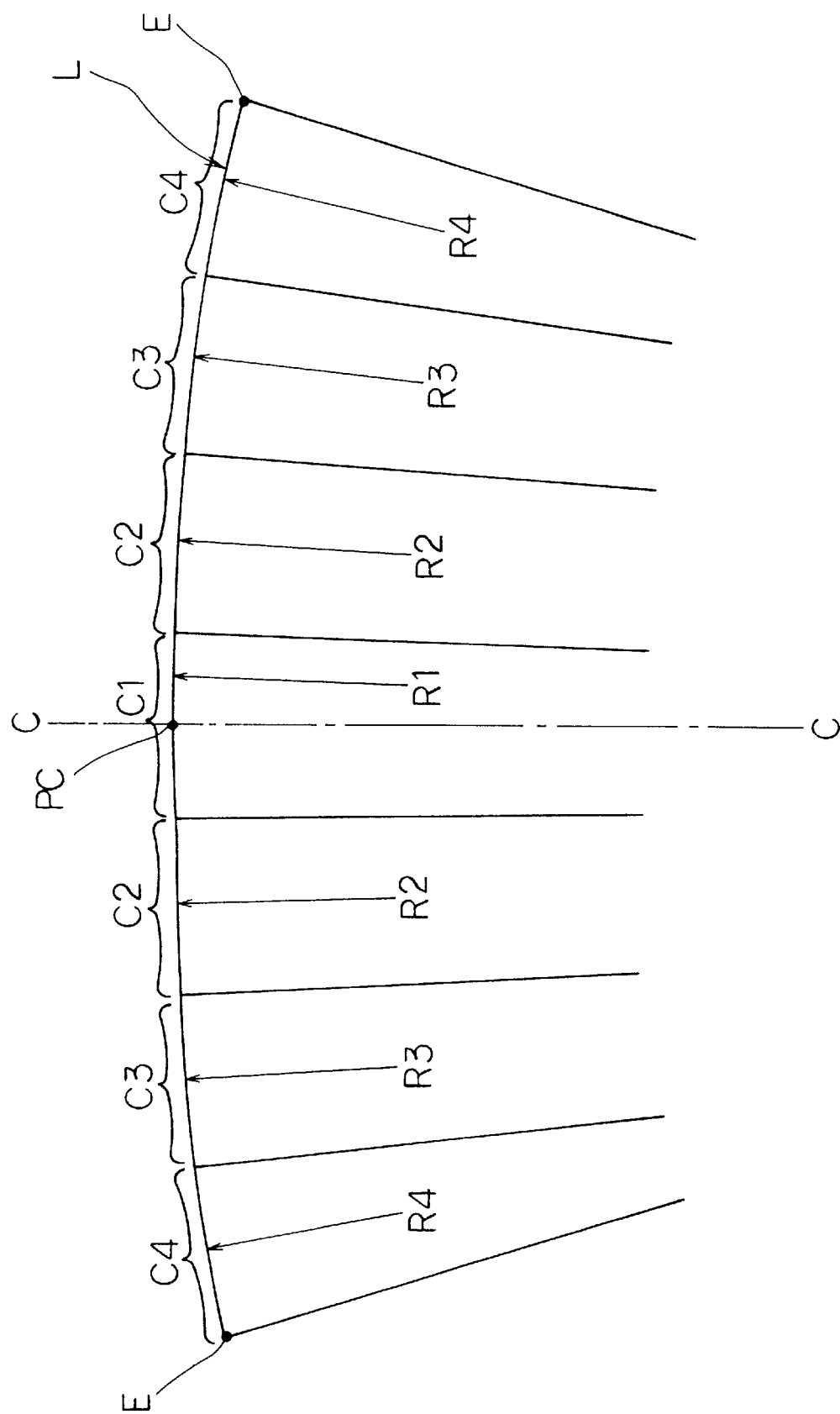

Fig. 18

| | Camber angle = 0 deg. | Camber angle = 3 deg. |
|---|---|---|
| Ex.11 (involute curve) | | |
| Ex.12 (involute curve) | | |
| Ex.13 (Fig.14) | | |

Fig. 19

| | Camber angle = 0 deg. | Camber angle = 3 deg. |
|---|---|---|
| Ref.11 (Fig.16) | | |
| Ref.12 (Fig.17) | | |
| Prior art (Fig.15) | | |

VEHICLE TIRE INCLUDING TREAD PORTION HAVING PROFILE

The present invention relates to a vehicle tire more particularly to an improved tread portion suitable for low aspect ratio tires being capable of improving the wear resistance and steering stability.

Recently, low aspect ratio tires are widely used in passenger cars especially high performance cars.

In general, if the radius of curvature of the tread is increased, the steering stability during high speed straight running may be improved. But, as the tread camber decreases, and also a camber angle is given by wheel alignment, the ground pressure is increased in the shoulder portion during cornering. Accordingly, uneven wear is liable to occur in the shoulder portion. Further, the high speed durability decreases when the tire is mounted on the wheel with a relatively large camber angle.

Therefore, in order to solve these problems, a relatively large camber is given to the shoulder portion by forming the shoulder portion with an arc having a small radius of curvature of about 200 to 300 mm whereas the tread crown portion is formed by an arc having a larger radius of curvature of not less than 1000 mm. That is to say, the tread profile is formed by a double radius curve.

In such a profile, even if the two arcs, crown arc and shoulder arc are connected with each other without forming any inflection point, the ground pressure increases in the vicinity of the connecting point between the arcs, and as a result uneven wear is liable to be caused, and sometimes the steering stability during high speed straight running and cornering performance are deteriorated.

It is therefore, an object the present invention to provide a vehicle tire in which the ground pressure distribution is evened to improve the wear resistance and running performance.

According to one aspect of the present invention, a vehicle tire comprises a tread portion of which tread radius of curvature decreases substantially continuously from the tire equator to the tread edges.

Here, the tread edges are defined as the axially outermost edges of the ground contacting patch of the tire which is mounted on a standard rim and inflated to a standard pressure and loaded with a standard load. The standard rim is the "Standard Rim" specified in JATMA, "Measuring Rim" in ETRTO, "Design Rim" in TRA or the like. The standard pressure is the maximum air pressure in JATMA, "Inflation Pressure" in ETRTO, maximum pressure given in the "Tire Load Limits at Various Cold Inflation Pressures" table in TRA or the like. The standard load is 88% cf the maximum load, which is the maximum load capacity in JATMA, "Load Capacity" in ETRTO, maximum value given in the above-mentioned table in TRA or the like.

Preferably, the tread profile is defined by a curve which is a part of the locus of an equation such as elliptic equation, cycloid equation, epicycloid equation, involute equation and the like, which equation is differentiatable in the range of variables corresponding to the range from the tire equator to each tread edge.

Embodiments of the present invention will now be described in detail in conjunction with the accompanying drawings.

FIG. 8 is a diagram for explaining a method of forming a tread curve by multiple arcs to approximate the loci.

FIGS. 18 and 19 show footprints of test tires.

Figure 1:
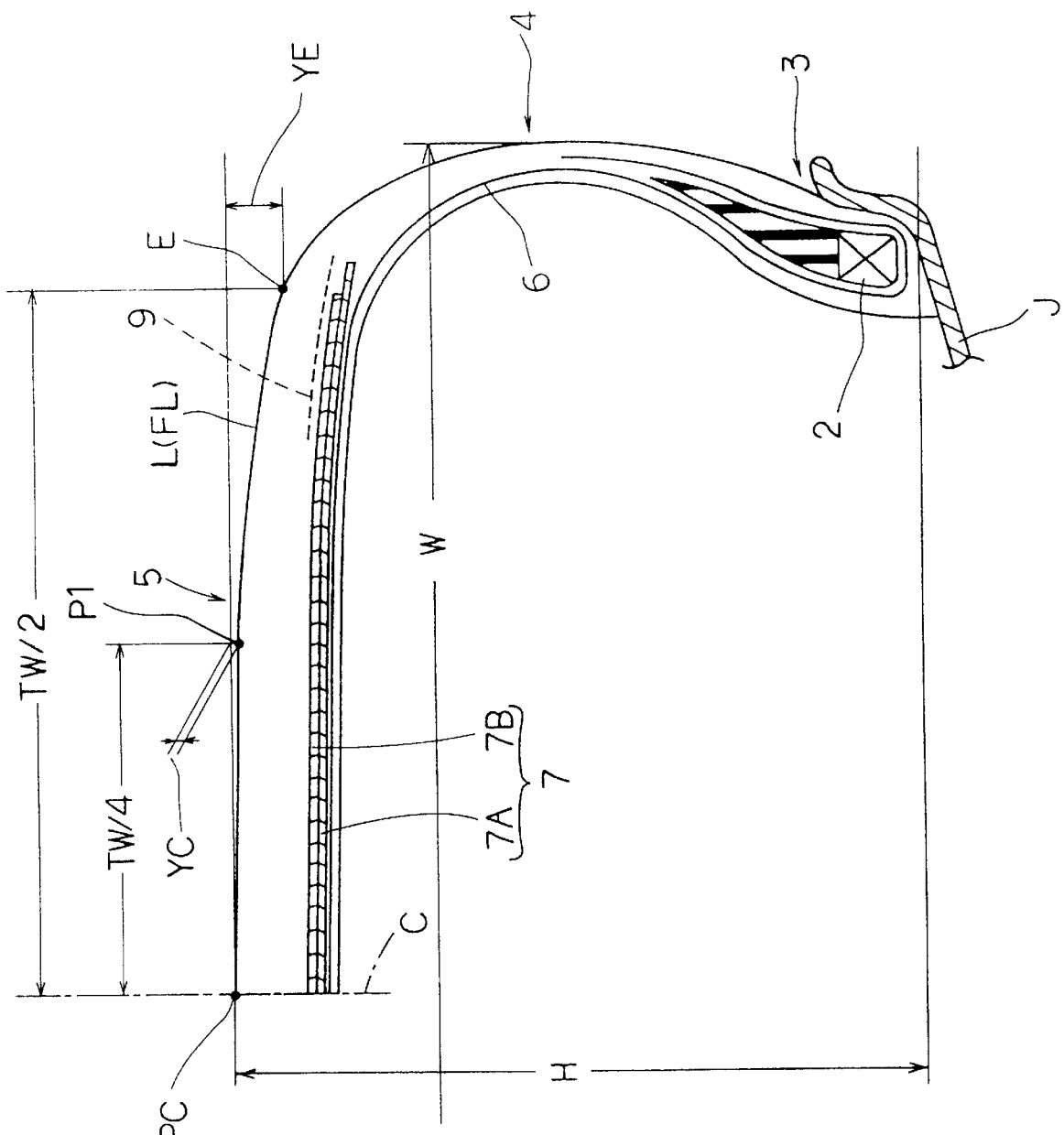
FIG. 1 is a cross sectional view of a tire according to the present invention showing an example of the internal tire structure.

In the drawings, vehicle tires according to the present invention are a pneumatic radial tire for passenger cars. The aspect ratio (section height H/section width W) is not more than 55% in this example 45%.

As shown in FIG. 1, the tire comprises a tread portion 5, a pair of sidewall portions 4, a pair of bead portion 3 with a bead core 2 therein, a carcass 6 extending between the bead portions 3 through the tread portion 5 and sidewall portions 4, and a belt 7 disposed radially outside the carcass 6 in the tread portion 5.

The carcass 6 is composed of at least one ply in this example a single ply of cords arranged radially at an angle of 70 to 90 degrees with respect to the tire equator C. For the carcass cords, organic fiber cords, for example nylon, polyester, rayon, aromatic polyamide and the like are used.

The belt 7 comprises at least one ply of parallel steel cords laid at an angle of 10 to 35 degrees with respect to the tire equator C. In this example two cross plies 7A and 7B called steel breaker are disposed. Aside from steel cords, high elastic modulus organic fiber cords made of rayon, aromatic polyamide or the like can be used. Further, it is possible to dispose a band ply 9 radially outside the breaker 7A, 7B so as to cover at least axially outer edges of the breaker to prevent their lifting during high speed running. The band ply 9 is preferably made of relatively low modulus organic fiber cords, such as nylon, and the cord angle is 0 to 5 degrees with respect to the tire equator C.

The tread portion 5 is usually provides with tread grooves for water drainage although such grooves are not shown in FIG. 1.

In the meridian section of the tire under the standard condition, the tread profile FL is defined by a curve L whose radius decreases substantially continuously from the tire equator PC to each tread edge E. Usually, the tread profile FL is symmetrical about the tire equatorial plane C. But it is possible to design the profile asymmetrical if necessary. Here, the standard condition is that the tire is mounted on the standard rim J and inflated to the standard pressure but loaded with no tire load.

The above-mentioned tread curve L is defined by an elliptic function, a cycloid function preferably epicycloid function, an involute function or the like. In such a function, accordingly, the continuously decreasing radius means that the equation is differentiable in the range of the variables (x and y) corresponding to the actual range of the tread profile between the tire equator PC at the tread surface and each tread edge E.

Taking a typical size of 235/45R17 for low aspect ratio pneumatic tires for passenger cars, a way of applying such a function to the actual tread profile will be explained more concretely.

$$\frac{x^2}{104.2^2} + \frac{(10.63-y)^2}{10.63^2} = 1 \quad (2)$$

Figure 3:
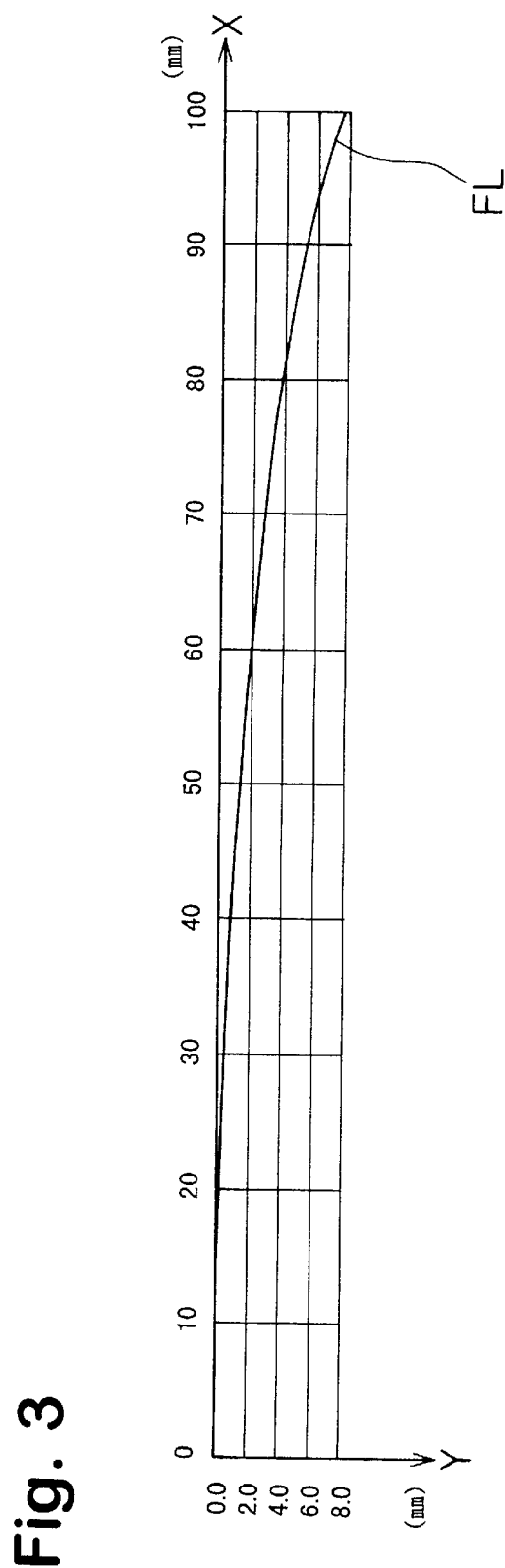
FIG. 3 is the locus of an elliptic equation for the tread curve.

The locus of this equation 2 which is described when the x value varies from 0 to 100 is used as each half of the tread curve L extending from the tire equator PC to each tread edge E. Thus tread profile is symmetrical about the tire equator. The tread camber Y (mm) at an axial position X (mm) is as follows, and the locus is shown in FIG. 3.

| X | 5 | 10 | 15 | 20 | 25 | 30 | 35 | 40 | 45 | 50 | 55 | 60 | 65 | 70 | 75 | 80 | 85 | 90 | 95 | 100 |
|---|---|----|----|----|----|----|----|----|----|----|----|----|----|----|----|----|----|----|----|-----|
| Y | 0 | 0 | 0.1 | 0.2 | 0.3 | 0.5 | 0.6 | 0.8 | 1 | 1.3 | 1.6 | 1.9 | 2.3 | 2.8 | 3.3 | 3.8 | 4.5 | 5.3 | 6.3 | 7.6 |

First, the tread camber Y is determined to satisfy that the arctangent $$\tan^{-1}\left(\frac{YE}{TW/2}\right)$$

of the tread camber YE at the tread edge E and a half tread width (TW/2) becomes equal to the actual camber angle in use which is usually about 3 to about 5 degrees for example about 4 degrees; and that the arctangent $$\tan^{-1}\left(\frac{YC}{TW/4}\right)$$

of the tread camber YC at the TW/4 point P1 and a quarter tread width (TW/4) is in the range of from about 1 to about 2 degrees for example about 2 degrees.

The tread width TW is the axial distance between the above-explained tread edges E.

Figure 2:
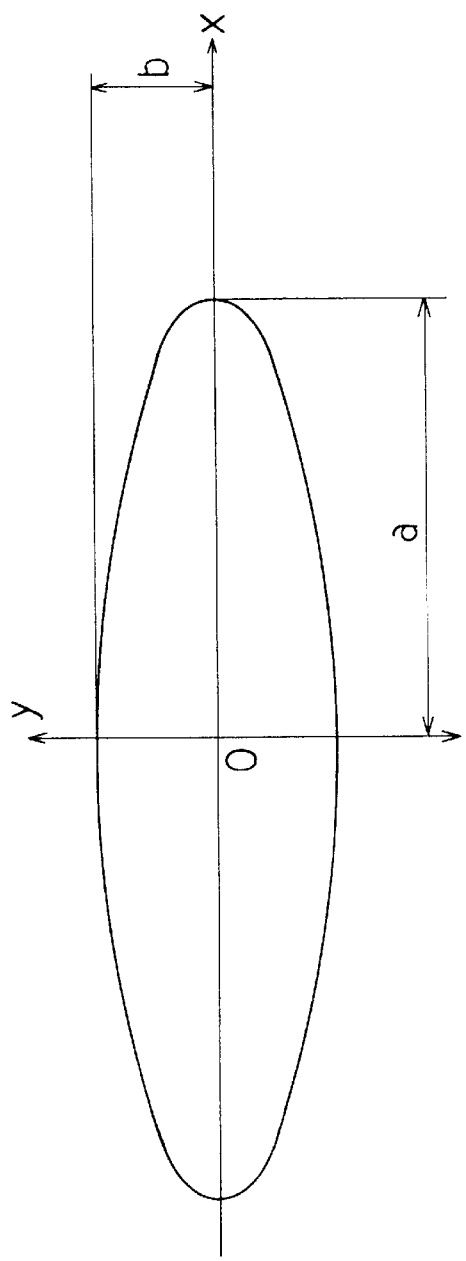
FIG. 2 is a diagram for explaining an elliptic equation.

In the above-mentioned tire size, for example, the camber YE at the tread edge E is 7.6 mm, the camber YC at the mid point P1 is 1.3 mm, and a half tread width TW/2 is 100 mm, Elliptic Curve FIG. 2 shows an ellipse, the basic elliptic equation of which is $$\frac{x^2}{a^2} + \frac{y^2}{b^2} = 1 \quad (1)$$

a>b.

In order to apply the elliptic equation to the tread curve L, the x-y axes are shifted as follows. The x-axis is an axial line extending from the tire equator PC towards the tread edge E. The y-axis is a radial line extending radially inwardly from the tire equator PC at the surface of the tread portion. The origin is thus at the tire equator PC on the surface of the tread portion.

In this coordinate system, the tread curve L must pass on two points of which x and y values are (x=50, y=1.3) and (x=100, y=7.6) because the camber values YC and YE are determined as above.

Hence, the equation of the tread curve L may be written as

Epicycloid Curve

Figure 4:
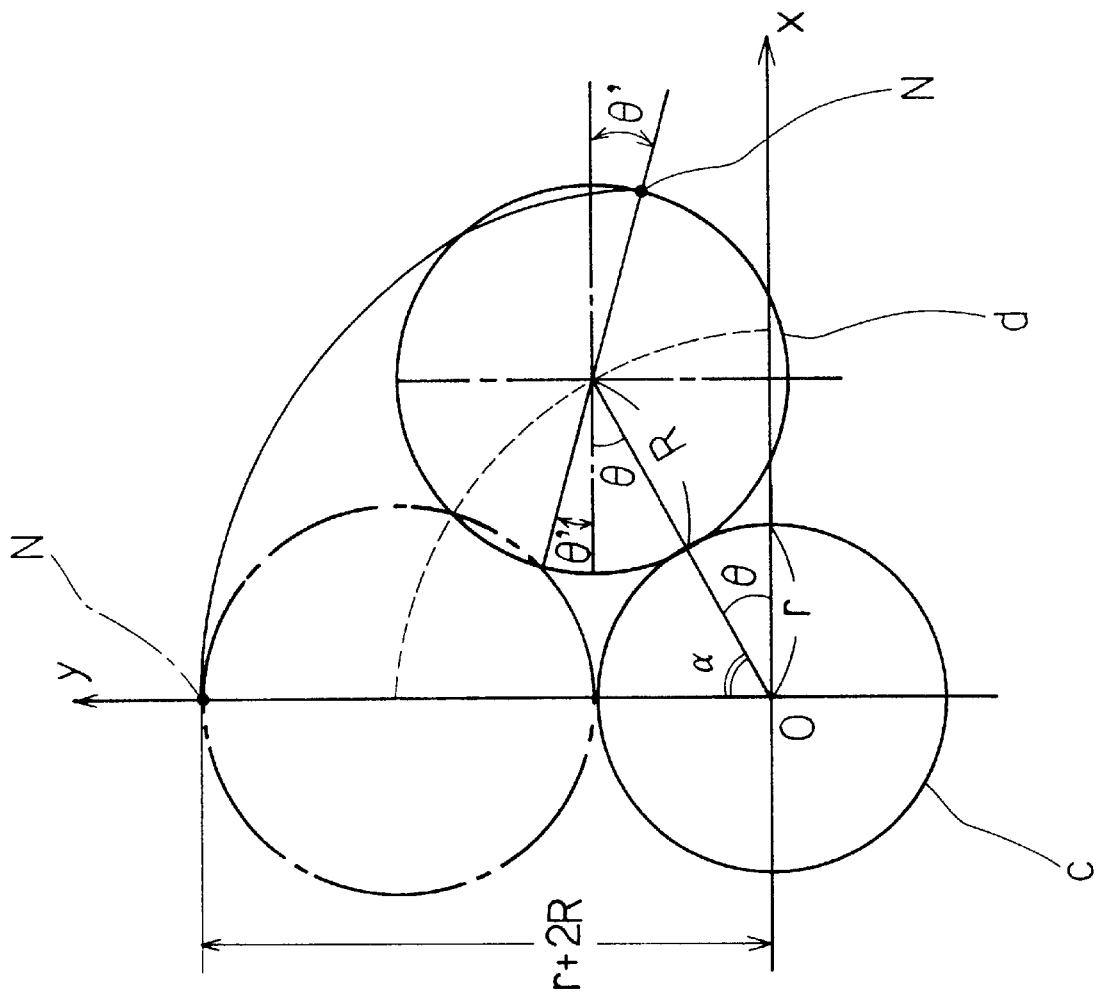
FIG. 4 is a diagram for explaining an epicycloid equation.

FIG. 4 shows an epicycloid. The epicycloid is the locus of a point N set on the circumference of a circle (d) rolling on the circumference of a fixed base circle (c) of which center is placed on the origin O of x-y coordinates. The basic epicycloid equation is $$x=(r+R)\cos\theta+R\cos\theta'$$

$$y=(r+R)\sin\theta+R\sin\theta' \quad (3)$$

wherein

θ is the angle between the x-axis and a straight line drawn between the center of the rolling circle and the center of the fixed base circle, and θ is the angle between the x-axis and a straight line drawn between the point N and the center of the rolling circle. In FIG. 4, the angles θ and θ' are counted counter-clockwise from the x-axis.

Since it is a premise that there is no slip between the rolling circle and base circle, we may write $$(\theta - \theta')R = r\left(\frac{\pi}{2} - \theta\right) \quad (4)$$

From this equation, $$k=r/R \quad (5)$$

$$\theta'=(k+1)\theta-\pi/2k \quad (6)$$

By the equations 6 and 3, $$x = (r+R)\cos\theta + R\cos\left\{(k+1)\theta - \frac{\pi}{2}k\right\} \quad (7)$$

$$y = (r+R)\sin\theta + R\sin\left\{(k+1)\theta - \frac{\pi}{2}k\right\}$$

To apply this equation to the actual tread curve L, the x-y axes are shifted in the same way as the above-mentioned elliptic function.

By the equation 7, the tread camber Y may be write as $$Y=A\times(r+2R-y) \quad (8)$$

(A=constant)

As explained above, the tread curve L must pass on two points of which x and y values are (x=50, y=1.3) and (x=100, y=7.6).

Hence, from the equations 7 and 8 and these conditions, the tread curve L may be written in the shifted x-y coordinate system as $$x = 63.35 \cdot \cos\theta + 45.25 \cdot \cos\left(1.4 \cdot \theta - \frac{\pi}{5}\right) \quad (9)$$

$$y = 0.104 \times \left\{108.6 - 63.35 \cdot \sin\theta - 45.25 \cdot \sin\left(1.4 \cdot \theta - \frac{\pi}{5}\right)\right\}$$

In this example, k=0.4, but it is possible to set at different value.

Figure 5:
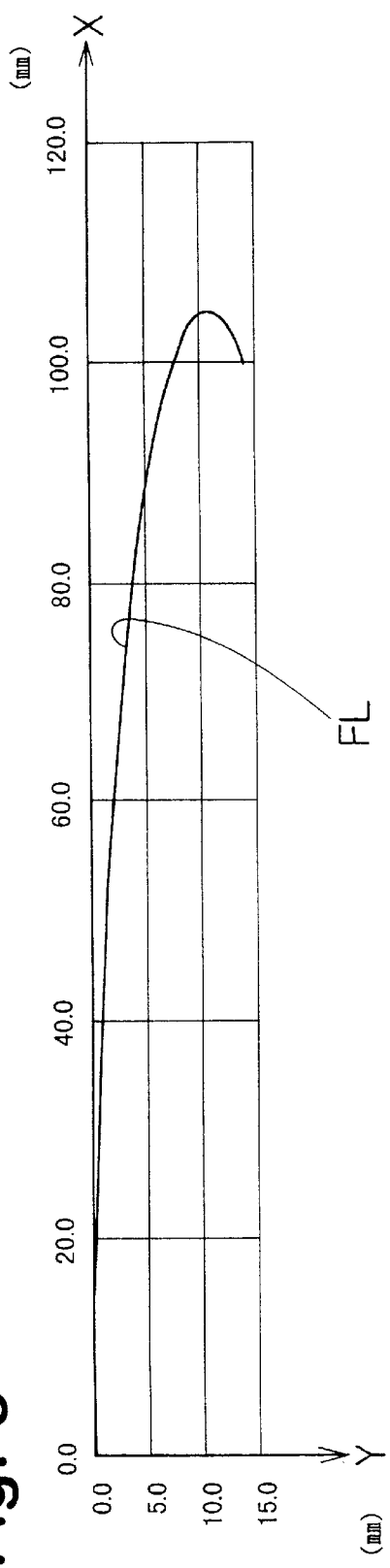
FIG. 5 is the locus of an epicycloid equation for the tread curve.

The locus of this equation (x=0 to 100) is used as each half of the tread curve L from the tire equator PC to each tread edge E. Thus the tread profile is symmetrical about the tire equatorial plane. The tread camber Y (mm) at an axial position X (mm) is as follows and the locus is shown in FIG. 5.

| X | 0.1 | 9 | 21.5 | 33.7 | 45.4 | 56.4 | 66.7 | 75.9 | 84 | 90.9 | 96.5 | 100 |
|---|---|---|---|---|---|---|---|---|---|---|---|---|
| Y | 0 | 0 | 0.2 | 0.6 | 1.1 | 1.7 | 2.5 | 3.4 | 4.3 | 5.4 | 6.6 | 7.6 |

Cycloid Curve

Figure 6:
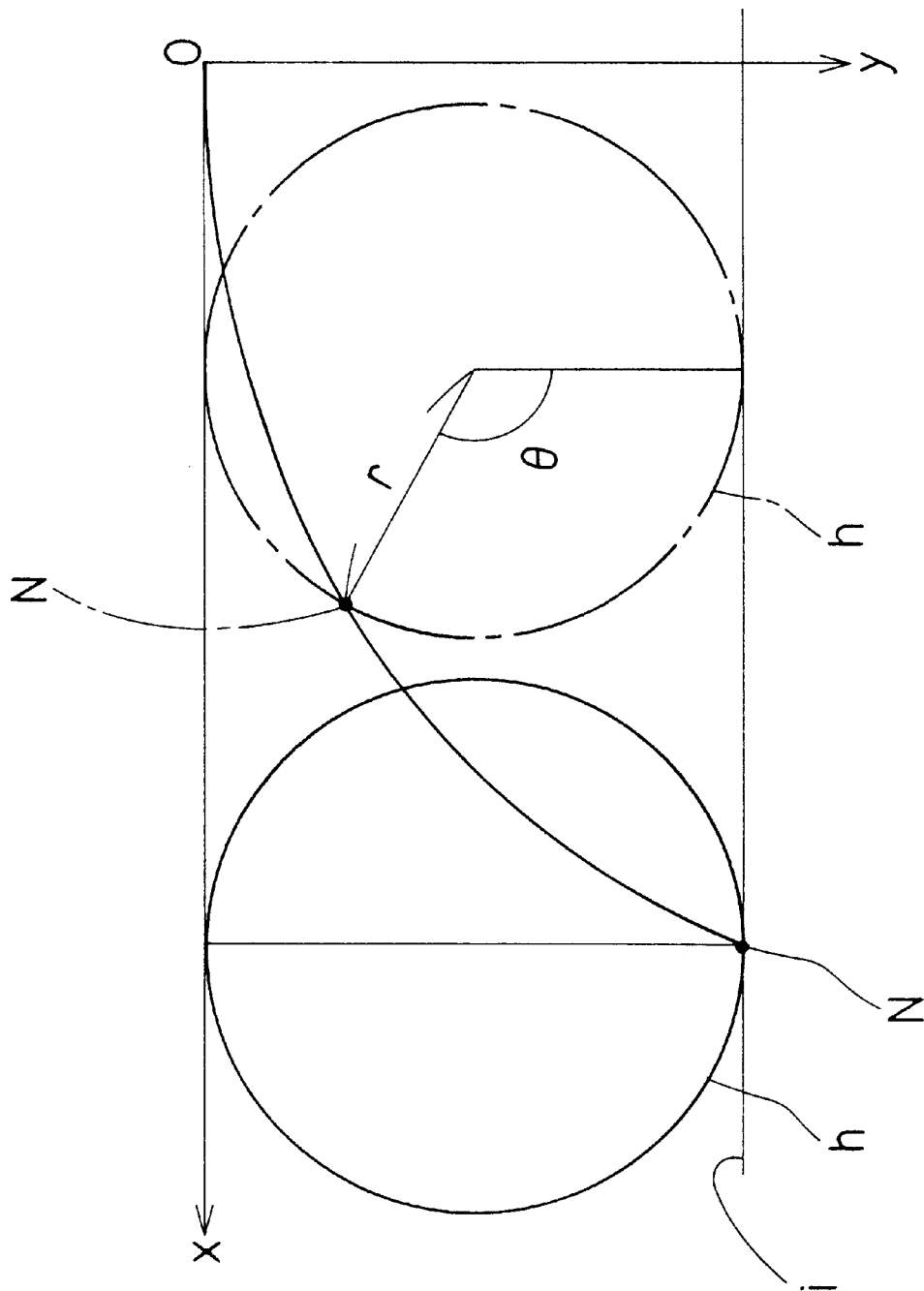
FIG. 6 is a diagram for explaining a cycloid equation.

FIG. 6 shows a cycloid. The cycloid is the locus of a point N set on the circumference of a circle (h) rolling on a straight line (i). The basic cycloid equation is $$x = \pi \cdot r - r(\theta - \sin\theta)$$
$$y = r(1 + \cos\theta) \quad (10)$$

wherein r is the radius of the rolling circle (h),

θ is the angle between the y-axis and a straight line drawn between the point N and the center of the rolling circle. The x-axis is an axial line extending from the tire equator PC towards each tread edge E. The y-axis is a radial line extending radially inwardly from the tire equator PC. The origin is thus the tire equator PC. There is no need to shift the x-y axes as in the former two cases.

By the equation 10, the tread camber Y may be written as $$Y = A \times r(1 + \cos\theta) \quad (11)$$

(A=constant)

From the equations 10 and 11 and the conditions that the tread curve L must pass on two points (x=50, y=1.3) and (x=100, y=7.6), the tread curve L may be written as $$x = 31.85 \times \pi - 31.85(\theta - \sin\theta)$$
$$y = 0.019 \times 31.85(1 + \cos\theta) \quad (12)$$

Figure 7:
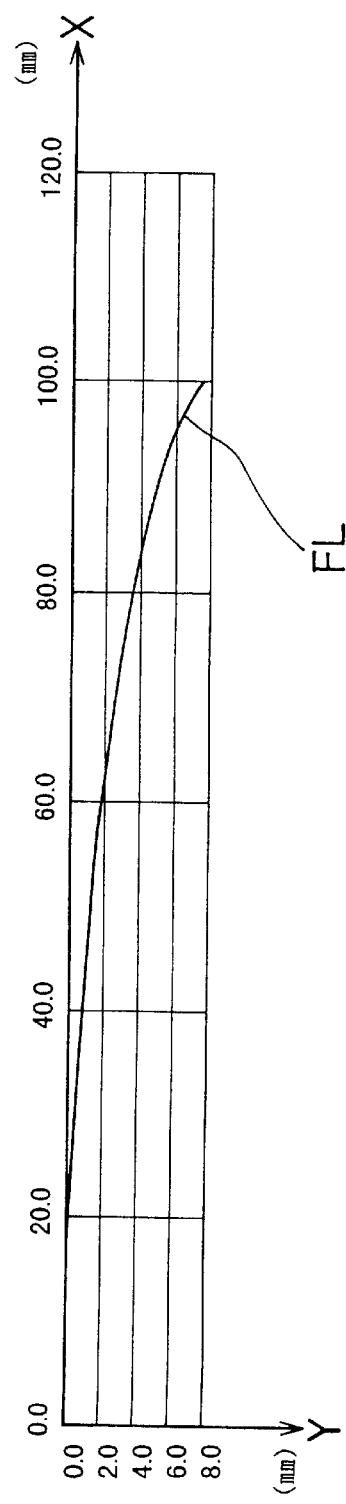
FIG. 7 is the locus of a cycloid equation for the tread curve.

The locus of this equation is shown in FIG. 7. The tread camber Y (mm) at an an axial position X (mm) is as follows.

According to the present invention, the tread curve L must be decreased continuously from the equator to the tread edges. However, it is not always necessary to strictly follow the locus of the above-explained equations. Slight aberrations may be permitted. In other words, as shown in FIG. 8, a curve composed of multiple arcs so as to approximate the locus may be used as far as the aberrations are small for example within plus minus 1/10 mm. This will be advantageous to making the tire vulcanizing mold. If importance is attached to such easiness of making the mold, the number of the arcs is in the range of from about 7 as shown in FIG. 8 to about 18.

Comparison Test

The following test tires were made and the ground pressure distribution was measured under the camber angle of 0 degree and 4 degrees.

Test tires: Ex.1 of which the tread profile is based on the epicycloid equation 9; Ex.2 based on the elliptic equation 2; and Conventional tire of which the tread profile is defined by a triple radius arc composed of a crown arc Rc (1100 mm), middle arc Rm (400 mm) and shoulder arc Rs (100 mm).

Tire size: 235/45R17

Wheel rim size: 17X8JJ (standard rim)

Inner pressure: 230 KPa

Tire load: 400 kgf

Tread camber: (X=50 mm Y=1.3 mm) and (X=100 mm Y=7.6 mm)

Figure 9:
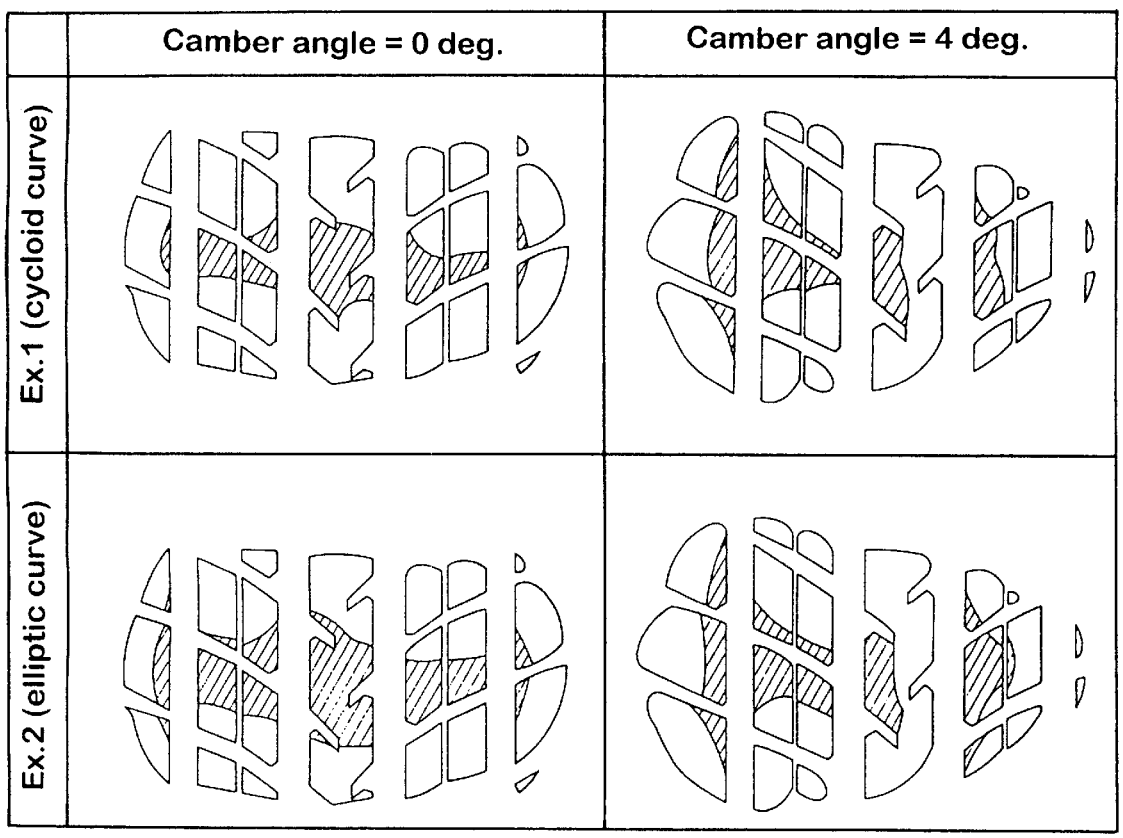
FIG. 9 shows footprints of test tires according to the invention.
Figure 10:
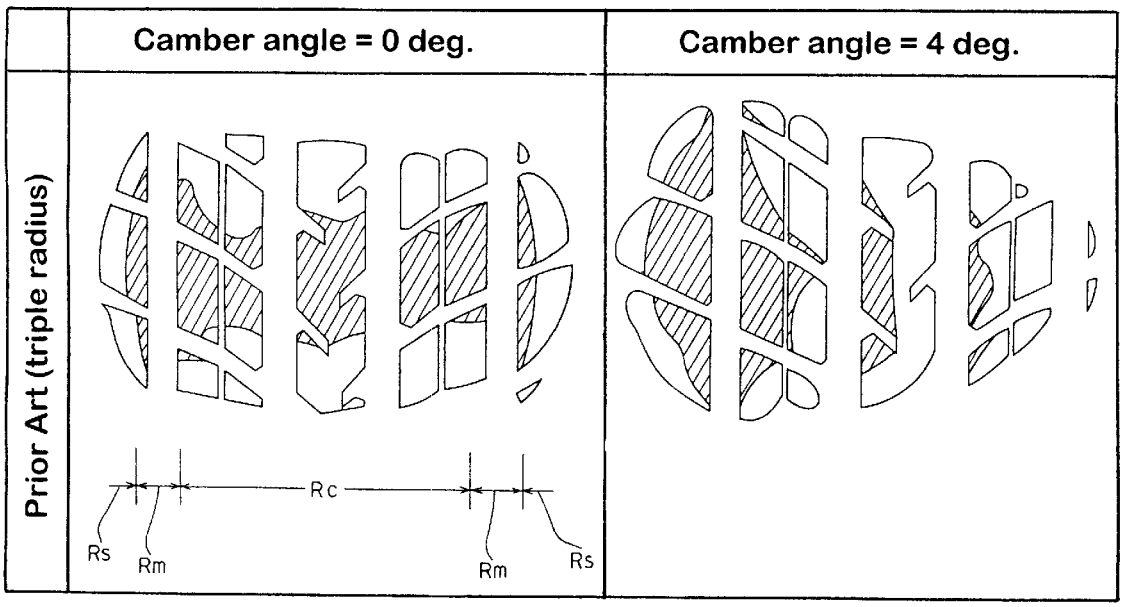
FIG. 10 shows footprints of a test tire according to a prior art.

The footprints obtained by the tests are shown in FIGS. 9 and 10, wherein the area of which the ground pressure was not less than 5.0 kgf/sq.cm is shaded.

Figure 11:
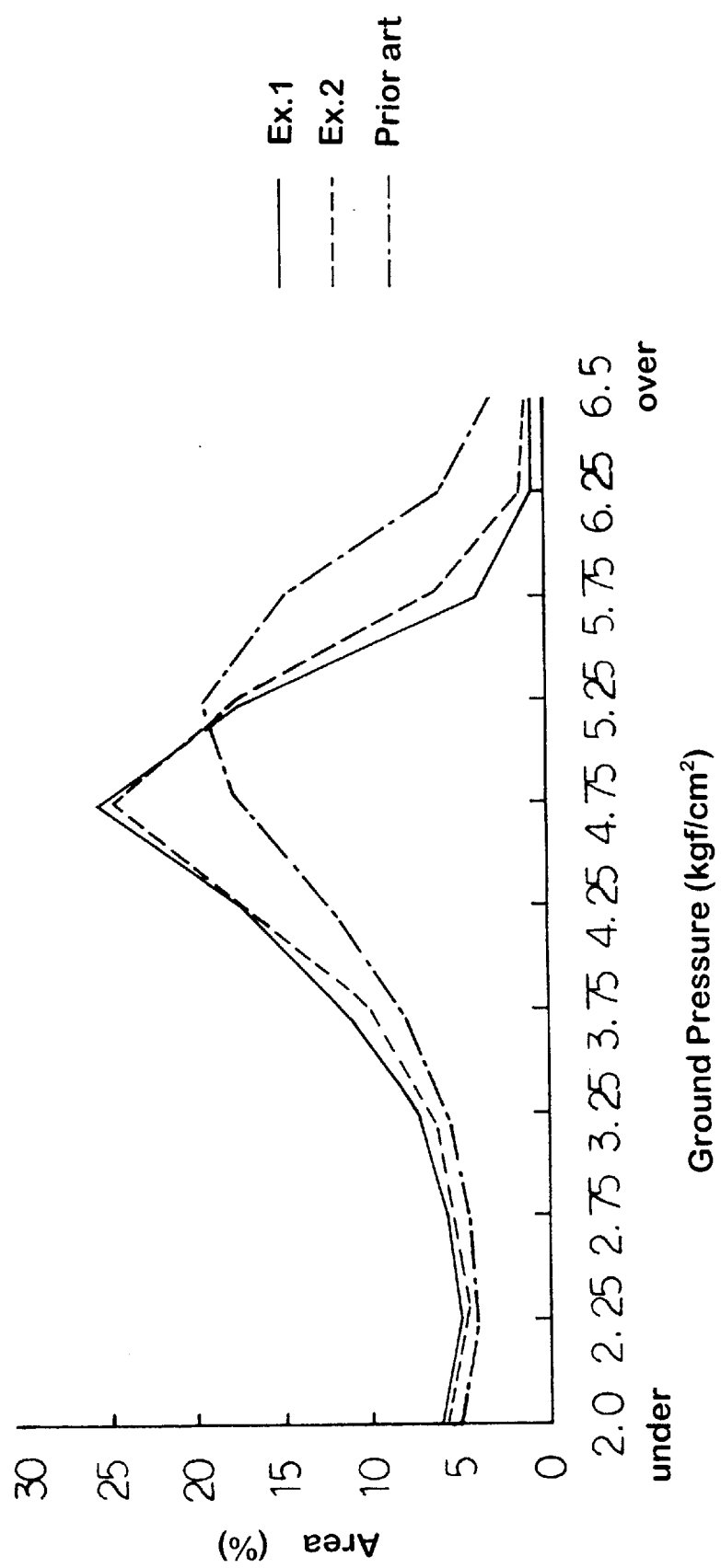
FIG. 11 is a graph showing the ground pressure distributions of the test tire.

FIG. 11 shows the area in percentage to the total ground contacting area as a function of ground pressure.

As apparent from FIGS. 9 and 10, in the tires according to the invention, the area of which the ground pressure is not less than 5.0 kgf/sq.cm is small in comparison with the conventional tire. Further, as shown in FIG. 11 in the tires according to the invention, the ground pressure of the widest area was 4.75 kgf/sq.cm, which is remarkably lowered when compared with the conventional tire which showed 5.25 kgf/sq.cm. Thus the occurrence of uneven wear can be effectively prevented.

Further, Example tire 1 was installed on a Japanese FR car with a 2500 cc turbocharged engine, and tested for the straight running stability, lane change stability, cornering performance, and high speed durability according to ECE30 (camber angle=0 and 4 degrees). The test results are as follows.

| X | 0.1 | 9 | 21.5 | 33.7 | 45.1 | 55.7 | 65.3 | 73.7 | 80.9 | 86.9 | 91.5 | 95 | 97.4 | 98.9 | 99.7 | 100 |
|---|---|---|---|---|---|---|---|---|---|---|---|---|---|---|---|---|
| Y | 0 | 0 | 0.2 | 0.5 | 1 | 1.6 | 2.2 | 2.9 | 3.7 | 4.4 | 5.2 | 5.8 | 6.4 | 6.9 | 7.3 | 7.6 |

| Tire | Ex. 1 | Conv. |
|---|---|---|
| Straight running stability | 8 | 6 |
| Lane change stability | 7 | 6 |
| Cornering performance | 8 | 6 |
| High speed durability | | |
| Camber angle = 0 deg. | 110 | 100 |
| Camber angle = 4 deg. | 98 | 100 |

The first three performances were evaluated into ten ranks wherein the standard is six. The high speed durability is indicated by an index based on that the conventional tire is 100. The larger the value, the better the performance. From the tests, it was confirmed that Example tire 1 was remarkably improved in the straight running stability and cornering performance when compared with the conventional tire.

Further, using Japanese 2500 cc FR cars provided with Example tire 1 and Conventional tire, the average wear was measured after running for 9000 km to obtain the running distance per 1 mm wear. Further, the shoulder wear (wear in shoulder portion/wear in crown portion) was also measured. The test results are as follows.

| Tire | Ex. 1 | conv. |
|---|---|---|
| Running distance (km) per 1 mm wear | 103 | 100 |
| Shoulder wear | 105 | 100 |

In this table, an index based on that the conventional tire is 100 is used. The larger the value, the better the performance.

Involute Curve

Figure 12:
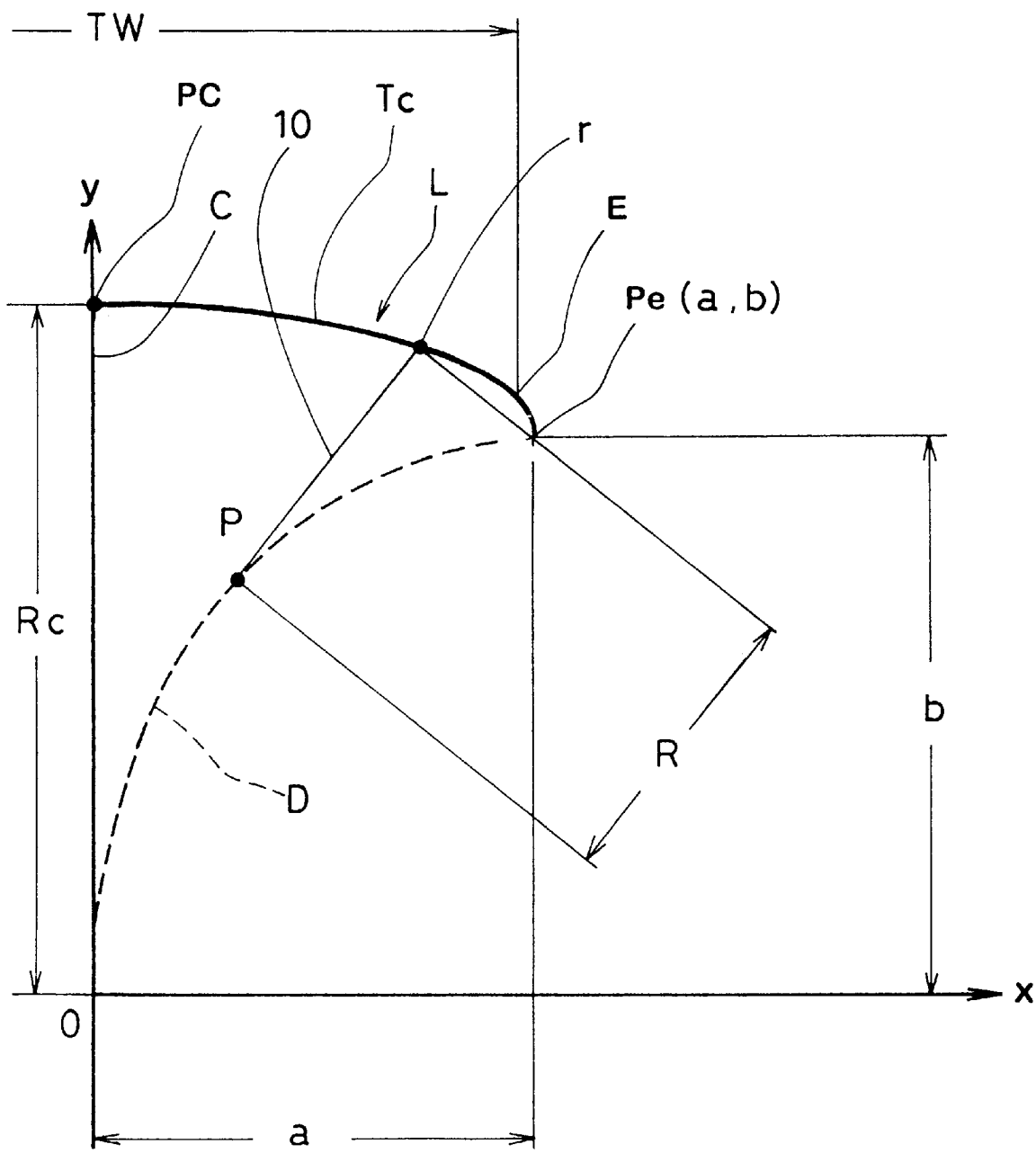
FIG. 12 is a diagram for explaining an involute curve of which the base circle is an ellipse.

FIG. 12 shows still another embodiment of the present invention, wherein the tread profile is such that the center of the radius R of the tread curve L describes an ellipse D. That is, the tread curve L is an involute curve of which the base circle is an ellipse D. The involute curve is the locus which is described by one end of a fixed length thread 10 of which the other end is fixed to the origin O when the thread 10 is wound around the ellipse (or unwound) without slack. In this example, in the same way as the former examples, the radius R decreases continuously from the tire equator PC at the surface of the tread portion to the tread edge E. In this case, it is possible or easy to determine the tread profile by fist giving radii of curvature to two positions such as the tire equator and tread edge.

To obtain an equation of the ellipse D, x-y coordinates are set as follows. The origin 0 is on the equatorial plane C at a predetermined distance from the surface of the tread portion at the tire equator PC which distance corresponds to the radius Rc of the tread curve L at the tire equator PC. The x-axis extends axially outwardly from the tire equator C in parallel with the tire axis. The y-axis extends radially outwardly along the equatorial plane C. In this coordinate system, the elliptic equation is $$\frac{(x-a)^2}{a^2} + \frac{y^2}{b^2} = 1 \quad (13)$$

wherein $y \geq 0$ $x = 0 \sim a$ $a$ = constant $b$ = constant $a \neq b$.

wherein $y \geq 0$ $x = 0 \sim a$ a=constant b=constant a≠b.

In this case, the radii of curvature at two points are determined in the first place. For example, when the tire size is 235/45R17 and the tread width TW=206 mm, the radius Rc at the tire equator PC is set as 1250 mm, the radius at the tread edge E is set as 52 mm. From the equation 13, the ellipse D as the base circle of involute curve is $$\frac{(x-115.2)^2}{115.2^2} + \frac{y^2}{1231.9^2} = 1 \quad (14)$$

By this equation, the tread camber YE at the tread edge is given as 8.6 mm. The tread curve L described is shown in FIG. 13.

Figure 13:
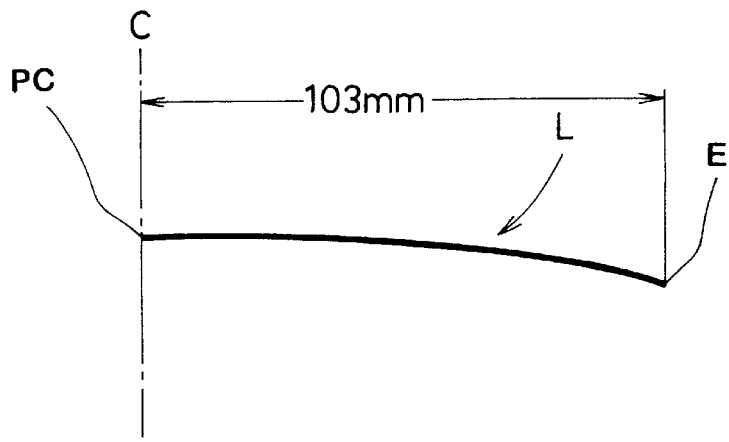
FIG. 13 shows an example of the tread profile based on an involute curve.
Figure 14:
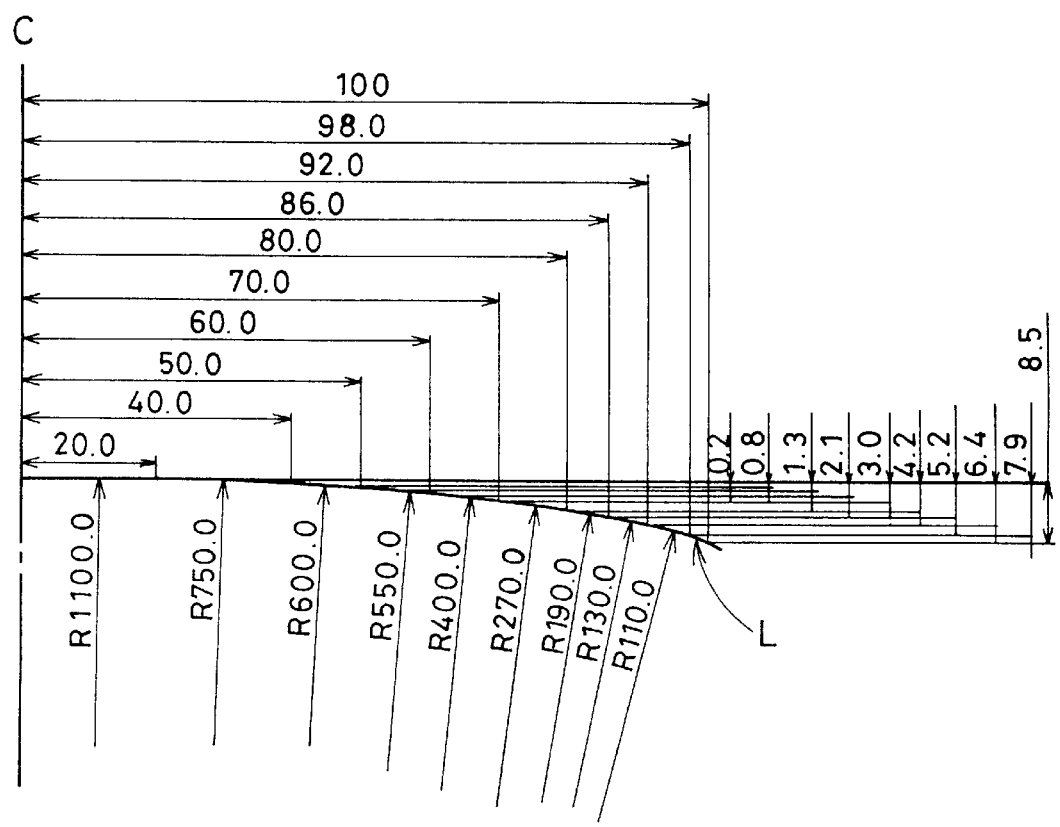
FIG. 14 shows a tread profile which approximates the involute curve of FIG. 13.

FIG. 14 show another example of the tread curve L which is composed of multiple arcs to approximate the tread curve shown in FIG. 13. In this example, a half tread curve is composed of nine arcs and the whole curve is composed of seventeen arcs. In this case, as explained above, the making of the vulcanizing mold becomes easier.

Aside from the above-explained accurate involute curve, such a pseudo involute curve that the length of the thread 10 is for example longer than the original length measured from the origin O to the point Pe (x=a, y=b) along the circumference of one quarter of the ellipse D. Further, it is also possible to set slightly shorter. In other words, it is not always necessary that the length of the thread 10 is equal to the curve length between the origin and the point Pe.

Comparison Test

The following test tires were made and the ground pressure distribution was measured.

Figure 15:
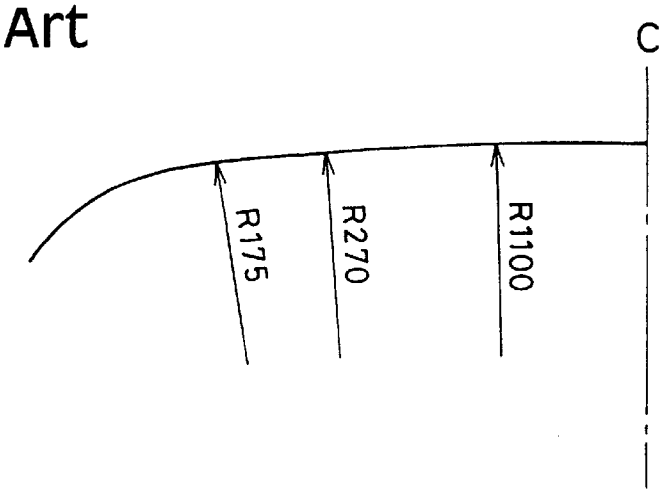
FIG.15 shows the tread profile of a test tire according to a prior art.
Figure 16:
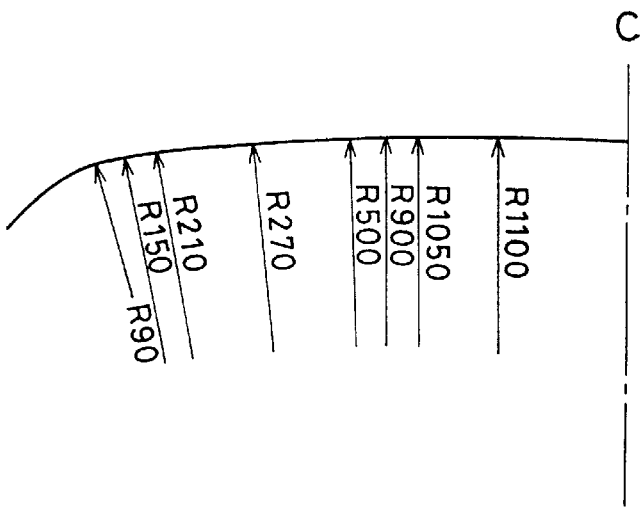
FIG. 16 shows the tread profile of reference tire 1.
Figure 17:
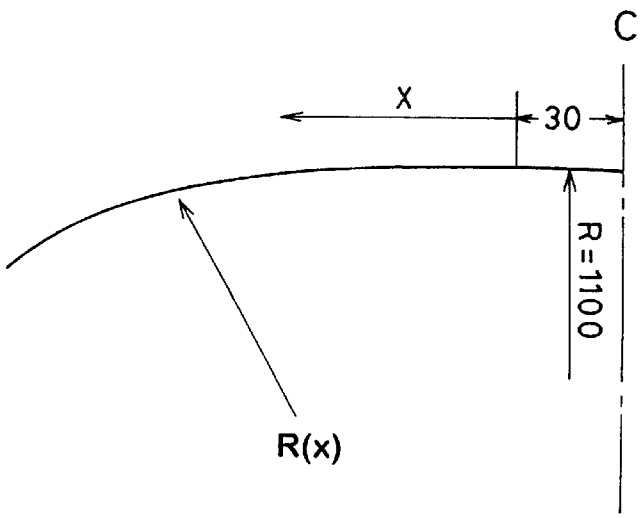
FIG. 17 shows the tread profile of reference tire 2.

Test tires: Exs.11 and 12 of which the tread profile is defined by an involute curve; Ex.13 of which the tread profile is defined by a curve composed of nine arcs shown in FIG. 14; Conventional tire of which the tread profile is defined by a curve composed of three arcs shown in FIG. 15; Ref.11 of which the tread profile is defined by a curve composed of eight arcs shown in FIG. 16: Ref.12 wherein as shown in FIG. 17 a central tread part extending 30 mm from the tire equator is defined by a constant radius of 1100 mm, and the axially outer part thereof is defined by a variable radius R which is $R = (7 \times 10^{-4} \times e^{(2.5 \times 10^{-2} \times X)} + 7.3 \times 10^{-5} \times X)^{-1}$ Tire size: 235/45R17

Tread width: TW=206 mm

Wheel rim: 17×8JJ (standard rim)

Inner pressure: 230 KPa

Tire load: 400 kgf

Camber angle: 0 and 3 degrees

The footprints of the test tires are shown in FIGS. 18 and 19, wherein the area of which the ground pressure was not less than 5.0 kgf/sq.cm is blacked out. The narrower the blacked area, the better the ground pressure distribution.

Further, in the same way as explained above, the tires were tested for the straight running stability, lane change stability, cornering performance, wear resistance, high speed durability, and rolling resistance. The results are as follows.

| Tire | Ex. 11 | Ex. 12 | Ex. 13 | Ref. 11 | Ref. 12 | conv. |
|---|---|---|---|---|---|---|
| Rc (mm) | 1250 | 1127.5 | 1250 | — | — | — |
| a (mm) | 115.2 | 115.2 | * | — | — | — |
| b (mm) | 1231.9 | 1111.17 | * | — | — | — |
| Stability | | | | | | |
| Straight running | 7 | 5 | 7 | 5 | 6 | 5 |
| Lane change | 6 | 6 | 6 | 5 | 5 | 5 |
| Cornering | 6 | 6 | 5 | 5 | 5 | 5 |
| Wear resistance | | | | | | |
| Running distance/ 1 mm wear | 106 | 103 | 105 | 100 | 98 | 100 |
| Shoulder wear | 105 | 110 | 103 | 100 | 95 | 100 |
| ECE30 High speed durability | | | | | | |
| camber angle = 0 deg. | 107 | 110 | 107 | 103 | 103 | 100 |
| camber angle = 4 deg. | 103 | 108 | 102 | 99 | 96 | 100 |
| Rolling resistance | 96 | 94 | 97 | 100 | 97 | 100 |

*) approximate Ex. 11 tread curve

From the tests, it was confirmed that Example tire 11 was greatly improved in the straight running stability, cornering performance and wear resistance in comparison with conventional tire. Furthermore, the rolling resistance was decreased.

What is claimed is:

1. A vehicle tire comprising a tread portion having a profile whose radius of curvature decreases substantially continuously from the tire equator at the surface of the tread portion to tread edges and wherein the tread profile in the range from the tire equator at the surface of the tread portion to each said tread edge is defined by a curve which is substantially an elliptic curve, the tread edges are axially outermost edges of the ground contacting patch of the tire when the tire is mounted on a standard rim and inflated to a standard pressure and loaded with a standard load, and in the following x-y coordinates: the origin is set on the surface of the tread portion at the tire equator; the x-axis extends from the tire equator towards each tread edge in parallel with the axis of the tire; and the y-axis extends radially inwards along the tire equator from the surface of the tread portion, the equation of the elliptic curve is $$\frac{x^2}{A^2} + \frac{(B-y)^2}{B^2} = 1$$

wherein $A$ = constant $B$ = constant $A > B$.

2. A vehicle tire comprising a tread portion having a profile whose radius of curvature decreases substantially continuously from the tire equator at the surface of the tread portion to tread edges and, wherein the tread profile in the range from the tire equator at the surface of the tread portion to each said tread edge is defined by a curve which is substantially an involute curve of which the base circle is an ellipse, the tread edges are axially outermost edges of the ground contacting patch of the tire when the tire is mounted on a standard rim and inflated to a standard pressure and loaded with a standard load, and in the following x-y coordinates: the origin is on the equatorial plane (C) of the tire and spaced from the surface of the tread portion by a distance which equals a radius Rc of the tread curve at the tire equator (PC); the x-axis extends in parallel with the tire axis toward each side of the equatorial plane; and the y-axis extends radially outwardly along the equatorial plane, the elliptic equation of the base circle is $$\frac{(x-a)^2}{a^2} + \frac{y^2}{b^2} = 1$$

wherein $a$ = constant $b$ = constant $a \neq b$.

3. The vehicle tire according to claim 2, wherein said constants (a) and (b) are such values that the length measured from a point where x=a and y=b to the origin along the elliptic curve is equal to the radius Rc.

* * * * *